(12) United States Patent
Bu et al.

(10) Patent No.: US 10,310,325 B2
(45) Date of Patent: Jun. 4, 2019

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhanchang Bu, Beijing (CN); Ming Chen, Beijing (CN); Bochang Wang, Beijing (CN); Yang Chu, Beijing (CN); Xian Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/540,162

(22) PCT Filed: May 17, 2016

(86) PCT No.: PCT/CN2016/082372
§ 371 (c)(1),
(2) Date: Jun. 27, 2017

(87) PCT Pub. No.: WO2017/133129
PCT Pub. Date: Aug. 10, 2017

(65) Prior Publication Data
US 2018/0046027 A1 Feb. 15, 2018

(30) Foreign Application Priority Data
Feb. 3, 2016 (CN) .................... 2016 2 0110978 U

(51) Int. Cl.
*F21V 8/00* (2006.01)
*G02F 1/1335* (2006.01)
*G02B 6/00* (2006.01)

(52) U.S. Cl.
CPC ......... *G02F 1/133602* (2013.01); *G02B 6/00* (2013.01); *G02B 6/0011* (2013.01); *G02F 1/133553* (2013.01)

(58) Field of Classification Search
CPC .. G02B 6/0055; G02B 6/0056; G02B 6/0016; G02B 6/0053; G02F 1/13362
See application file for complete search history.

(56) References Cited

U.S. PATENT DOCUMENTS 6,266,108 B1 * 7/2001 Bao ................. G02B 6/003
349/113
7,290,917 B2 * 11/2007 Cho .................. G02B 6/0016
362/331

(Continued)

FOREIGN PATENT DOCUMENTS

CN 101131498 A 2/2008
CN 102565923 A 7/2012
(Continued)

OTHER PUBLICATIONS

International Search Report and Written Opinon dated Oct. 19, 2016; PCT/CN2016/082372.

*Primary Examiner* — Seung H Lee
(74) *Attorney, Agent, or Firm* — Ladas & Parry LLP

(57) ABSTRACT

A backlight module and a display device are disclosed. The backlight module includes a bottom reflecting plate; a light guide plate (LGP) fixed over the bottom reflecting plate by means of glue; and a transparent material layer disposed between the bottom reflecting plate and the LGP, wherein a refractivity of the transparent material layer is at least lower than a refractivity of the LOP. The display device includes the backlight module.

13 Claims, 1 Drawing Sheet

(56) References Cited

U.S. PATENT DOCUMENTS

| | | | |
|---|---|---|---|
| 8,259,255 B2* | 9/2012 | Yu | G02B 6/0056 349/103 |
| 9,581,749 B2* | 2/2017 | Okuyama | G02B 6/0055 |
| 2008/0298067 A1* | 12/2008 | Chu | G02B 6/0023 362/267 |
| 2010/0007818 A1* | 1/2010 | Saitoh | G02B 5/045 349/61 |
| 2014/0126238 A1* | 5/2014 | Kao | G02B 6/0065 362/608 |
| 2016/0092011 A1* | 3/2016 | Kong | H05K 1/097 345/174 |
| 2017/0269283 A1* | 9/2017 | Wang | G02B 6/0016 |

FOREIGN PATENT DOCUMENTS

| | | |
|---|---|---|
| CN | 202791646 U | 3/2013 |
| CN | 103148451 A | 6/2013 |
| CN | 204855852 U | 12/2015 |
| JP | 2001-006415 A | 1/2001 |
| JP | 2007-305426 A | 11/2007 |

\* cited by examiner

BACKLIGHT MODULE AND DISPLAY DEVICE

TECHNICAL FIELD

Embodiments of the present invention relate to a backlight module and a display device.

BACKGROUND

At present, for a backlight module of a liquid crystal display device, as illustrated in FIG. 1, a light guide plate (LGP) 01 and a bottom reflecting plate 02 are assembled in a manner of overlapping. In such structure, an air interlayer 03 having a thickness in an order of micron is formed between the LGP 01 and the bottom reflecting plate 02. The air has a refractivity n2=1 while the LGP 01 has a refractivity n1=1.5, thus light emitted by a backlight source 04 may be subjected to a total reflection when arriving at a contact interface between the air and the LGP 01, so as to be propagated inside the LGP 01. Moreover, the light will be emitted through a front surface of the LGP 01 upon subjecting to scattering at dot patterns 05 on the LGP 01, so as to change its direction of propagation. In the above solution where the LGP 01 and the bottom reflecting plate 02 are assembled in a manner of overlapping, a back plate is to be disposed below the bottom reflecting plate 02 for supporting, which, however, would make it difficult to achieve a slim design of the backlight module and the whole product.

SUMMARY

In view of this, the embodiments of the present invention provide a backlight module and a display device which can achieve the slim design while ensuring the optical effect.

In order to achieve the above objectives, the embodiments of the present invention adopt technical solutions as below.

A backlight module, including: a bottom reflecting plate; a light guide plate (LGP) fixed over the bottom reflecting plate by means of glue; and a transparent material layer disposed between the bottom reflecting plate and the LGP, wherein a refractivity of the transparent material layer is at least lower than a refractivity of the LGP.

In an example, the transparent material layer is disposed on a surface of the bottom reflecting plate facing the LGP, and the refractivity of the transparent material layer is further lower than a refractivity of the glue.

In an example, the transparent material layer is disposed on a surface of the LGP facing the bottom reflecting plate.

In an example, the refractivity of the transparent material layer is lower than 1.2.

In an example, the refractivity of the transparent material layer is 0.18, 0.47 or 1.1.

In an example, a thickness of the transparent material layer is 100 nm-80 μm.

In an example, the thickness of the transparent material layer is 100 nm-5 μm.

In an example, a material of the transparent material layer is nano material.

In an example, the nano material is nano-metal material.

In an example, the nano-metal material is one selected from or a combination of more than one selected from a group consisted of nano-Ag, nano-Au and nano-bronze.

A display device including the above backlight module provided by the embodiments of the present invention.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Figure 1:
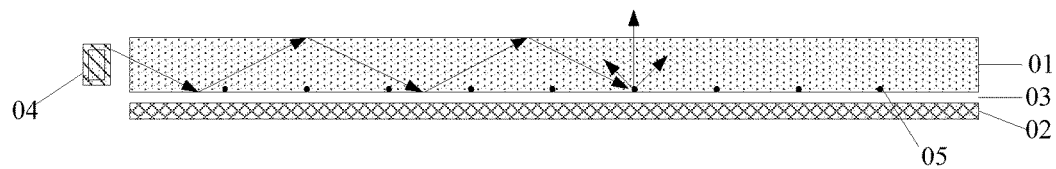
FIG. 1 is a schematic structural view of a backlight module.
Figure 2:
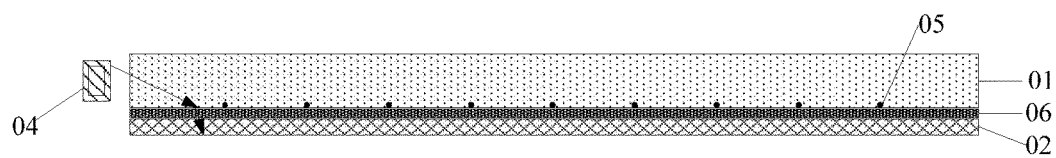
FIG. 2 is a schematic structural view of another backlight module.

FIG. 2 is a schematic structural view of a backlight module with slim design. As illustrated in FIG. 2, in order to omit the back plate for supporting, the bottom reflecting plate 02 is directly glued onto the LGP 01. The glue 06 usually has a thickness of about 50 μm, which is equivalent to that of the air interlayer 03. As a result, such structure can achieve a slim design. However, the glue usually has a refractivity n3 of about 1.6, which is extremely close to that of the LGP 01. Thus it's difficult for a total reflection to be occurred at the contact interface between the LGP 01 and the glue 06, which goes against the light propagating to a distal end of the LGP 01 in a manner of total reflection, and adversely influences the optical effect of the backlight module.

Figure 3:
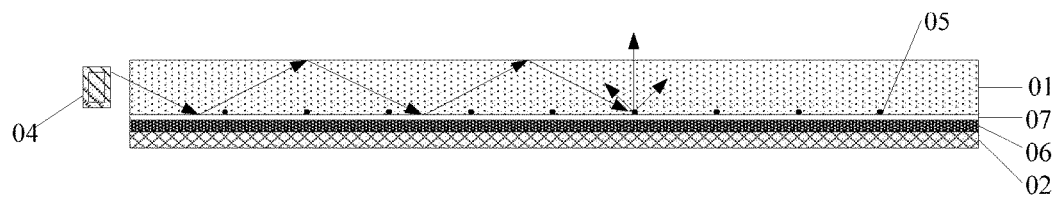
FIG. 3 is a schematic structural view of a backlight module provided by an embodiment of the present invention.
Figure 4:
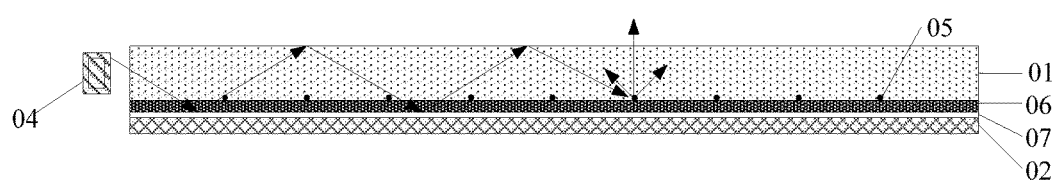
FIG. 4 is another schematic structural view of the backlight module provided by the embodiment of the present invention.

As illustrated in FIG. 3 and FIG. 4, the embodiments of the present invention provide a backlight module, including: a bottom reflecting plate 02; a LGP 01 fixed above the bottom reflecting plate 02 by means of glue 06; and a transparent material layer 07 disposed between the bottom reflecting plate 02 and the LGP 01. The transparent material layer 07 has a refractivity which is at least lower than that of the LGP 01.

In the backlight module provided by the embodiment of the present invention, the bottom reflecting plate 02 and the LGP 01 are directly fixed with each other by glue 06 so as to achieve the slim design, because it omits the back plate for supporting; moreover, the transparent material layer 07 is added between the bottom reflecting plate 02 and the LOP 01 to replace the air interlayer, so that a total reflection can be occurred at a contact interface between the LGP 01 and the transparent material layer 07, which ensures that the light can be propagating to a distal end of the LGP 01 from a backlight source 04 in a manner of total reflection, thereby achieving the optical effect required by the backlight module.

In an example as illustrated in FIG. 3, the transparent material layer 07 may be disposed on a surface of the LGP 01 facing the bottom reflecting plate 02; that is, the transparent material layer 07 is manufactured at a surface of the LGP 01 on which dot patterns 05 are formed. Such structure is advantageous in that, the light emitted from the backlight source 04 can be subjected to a total reflection when arriving at the contact interface between the LGP 01 and the transparent material layer 07, without passing through the glue 06; in this way, the light can be propagated inside the LGP 01. Such structure is disadvantageous in that, the arrangement of the dot patterns 05 results in a relatively uneven surface of the LGP, which goes against the formation of a flat transparent material layer 07.

In another example as illustrated in FIG. 4, the transparent material layer 07 may be disposed on a surface of the bottom reflecting plate 02 facing the LGP 01; that is, the transparent material layer 07 is manufactured at a surface of the bottom reflecting plate 02 which further requires a refractivity of the transparent material layer 07 being lower than that of the glue 06. Such structure is advantageous in that, the transparent material layer 07 may be easily manufactured on the bottom reflecting plate 02 having a relatively flat surface, which facilitates the manufacturing process of the transparent material layer 07. Such structure is disadvantageous in that, light emitted from the backlight source 04 is subjected to a total reflection only when it passes through the glue 06 and arrives at the contact interface between the glue 06 and the transparent material layer 07, then the light is incident on the LOP 01 to be propagated inside the LGP 01; in which a light loss may be occurred when passing through the glue 06.

According to the embodiments of the present invention, both of the glue 06 and the LOP 01 have a refractivity of about 1.5, thus in an example a material having a refractivity lower than 1.2 may be selected to form the transparent material layer 07. Moreover, experiments have demonstrated that, the transparent material layer 07 having a refractivity of about 1.2 allows the light incident at an angle of about 50° to be subjected to a total reflection, of which the effect is substantially equivalent to that obtained by an air interlayer having a refractivity of about 1.0.

In an example, a material having a refractivity of 0.18, 0.47 or 1.1 may be selected to form the transparent material layer 07.

In an example, a thickness of the transparent material layer 07 may be controlled within a range of 100 nm-80 μm to achieve transparent characteristics thereof. For instance, the thickness of the transparent material layer 07 may be controlled within a range of 100 nm-5 μm.

In an example, a nano material may be selected to form the transparent material layer 07 so as to satisfy requirements on both of refractivity and transparent characteristics.

In an example, the nano material for forming the transparent material layer 07 may be nano-metal material. For instance, the nano-metal material may be one of or a combination of more of nano-Ag, nano-Au and nano-bronze. The nano-Ag has a refractivity of about 0.18, which can achieve a total reflection in a better way. The nano-Au has a refractivity of about 0.47, and the nano-bronze has a refractivity of about 1.1.

Based on the same inventive concept, the embodiments of the present invention further provide a display device including the backlight module provided above. The display device may be implemented in any products or components having display function such as mobile phone, tablet PC, television, displayer, notebook computer, digital photo frame and navigator. The implementation of the backlight module in the display device provided by the embodiment of the present invention may refer to that of the backlight module described in the foregoing embodiments, without repeating details thereof.

In the backlight module and the display device provided by the embodiments of the present invention, the bottom reflecting plate and the LGP are directly fixed together through glue, which omits the back plate for supporting and hence achieves slim design; moreover, the transparent material layer having a refractivity at least lower than that of the LGP is added between the bottom reflecting plate and the LGP to replace the air interlayer so that a total reflection can be occurred at the contact interface of the LGP and the transparent material layer, which ensures that the light can be propagated to the distal end of the LGP to achieve the optical effect required by the backlight module.

Obviously, various modifications and deformations can be made to the present invention by those skilled in the art without departing from the spirit and scope of the present invention. Therefore, the present invention is intended to include the modifications and deformations fallen within the scope of the appended claims and equivalents thereof.

The present application claims the benefits of Chinese patent application No. 201620110978.8 filed with the SIPO on Feb. 3, 2016 under the title "BACKLIGHT MODULE AND DISPLAY DEVICE", which is incorporated herein by reference as part of the application.

The invention claimed is:

1. A backlight module, comprising:
a bottom reflecting plate;
a light guide plate (LGP) fixed over the bottom reflecting plate by means of a glue layer; and
a transparent material layer disposed between the bottom reflecting plate and the LGP, wherein
a refractivity of the transparent material layer is at least lower than a refractivity of the LGP, wherein
the glue layer is disposed between the LGP and the transparent material layer, and
a material of the transparent material layer is one of or a combination of nano-Au and nano-bronze.

2. The backlight module of claim 1, wherein the transparent material layer is disposed on a surface of the bottom reflecting plate facing the LGP, and the refractivity of the transparent material layer is further lower than a refractivity of the glue.

3. The backlight module of claim 2, wherein the refractivity of the transparent material layer is lower than 1.2.

4. The backlight module of claim 1, wherein the transparent material layer is disposed on a surface of the LGP facing the bottom reflecting plate.

5. The backlight module of claim 4, wherein the refractivity of the transparent material layer is lower than 1.2.

6. The backlight module of claim 1, wherein the refractivity of the transparent material layer is lower than 1.2.

7. The backlight module of claim 6, wherein the refractivity of the transparent material layer is 0.18, 0.47 or 1.1.

8. The backlight module of claim 1, wherein a thickness of the transparent material layer is 100 nm-80 μm.

9. The backlight module of claim 8, wherein the thickness of the transparent material layer is 100 nm-5 μm.

10. A display device comprising a backlight module, the backlight module comprises:
- a bottom reflecting plate;
- a light guide plate (LGP) fixed over the bottom reflecting plate by means of a glue layer; and
- a transparent material layer disposed between the bottom reflecting plate and the LGP, wherein
- a refractivity of the transparent material layer is at least lower than a refractivity of the LGP, wherein
- the glue layer is disposed between the LGP and the transparent material layer, and
- a material of the transparent material layer is one of or a combination of nano-Au and nano-bronze.

11. The display device of claim 10, wherein the transparent material layer is disposed on a surface of the bottom reflecting plate facing the LGP, and the refractivity of the transparent material layer is further lower than a refractivity of the glue.

12. The display device of claim 10, wherein the transparent material layer is disposed on a surface of the LGP facing the bottom reflecting plate.

13. The display device of claim 10, wherein the refractivity of the transparent material layer is lower than 1.2.

* * * * *